(12) United States Patent
Poder

(10) Patent No.: US 12,412,466 B2
(45) Date of Patent: Sep. 9, 2025

(54) BUILDING SECURITY SYSTEM

(71) Applicant: Comcast Cable Communications, LLC, Philadelphia, PA (US)

(72) Inventor: James Poder, Cheltenham, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

(21) Appl. No.: 15/782,909

(22) Filed: Oct. 13, 2017

(65) Prior Publication Data
US 2018/0261075 A1 Sep. 13, 2018

Related U.S. Application Data

(63) Continuation of application No. 15/352,853, filed on Nov. 16, 2016, now Pat. No. 9,852,604, which is a continuation of application No. 14/936,099, filed on Nov. 9, 2015, now Pat. No. 9,530,303, which is a continuation of application No. 14/511,906, filed on Oct. 10, 2014, now Pat. No. 9,214,080, which is a continuation of application No. 13/604,938, filed on Sep. 6, 2012, now Pat. No. 8,902,311, which is a continuation of application No. 13/243,463, filed on Sep. 23, 2011, now Pat. No. 8,289,147, which is a
(Continued)

(51) Int. Cl.
G08B 25/00 (2006.01)
G08B 13/24 (2006.01)
G08B 25/14 (2006.01)
H04N 7/18 (2006.01)

(52) U.S. Cl.
CPC ....... G08B 25/001 (2013.01); G08B 13/2491 (2013.01); G08B 25/00 (2013.01); G08B 25/002 (2013.01); G08B 25/14 (2013.01); H04N 7/183 (2013.01); H04N 7/188 (2013.01)

(58) Field of Classification Search
CPC .................................................. G08B 25/001
USPC .......... 340/517, 3.1, 506, 511, 539.1, 539.11
See application file for complete search history.

(56) References Cited

U.S. PATENT DOCUMENTS 4,103,293 A    7/1978   La Forge, Jr.
5,400,246 A *  3/1995   Wilson ................... G06F 3/023
                                                              340/12.53
(Continued)

FOREIGN PATENT DOCUMENTS

EP    1959409 A2    8/2008
EP    2192563 A1    6/2010
(Continued)

OTHER PUBLICATIONS

European Search Report—EP 12183032—Mailing Date: Oct. 23, 2012.
(Continued)

Primary Examiner — Daryl C Pope
(74) Attorney, Agent, or Firm — Banner & Witcoff, Ltd.

(57) ABSTRACT

A security system that can be used in a home, office, or other building in order to generate alarms or take other actions depending on conditions within the building. The security system may rely on sensors within the building which sense various conditions and collect other data. The information learned from the sensors can be communicated to a location outside the building for processing, such as, but not limited to, processing associated with a need to instigate an alarm.

31 Claims, 2 Drawing Sheets

Related U.S. Application Data continuation of application No. 12/324,139, filed on Nov. 26, 2008, now Pat. No. 8,049,613.

(56) References Cited

U.S. PATENT DOCUMENTS

| | | | | |
|---|---|---|---|---|
| 5,959,529 | A * | 9/1999 | Kail, IV | G01S 19/17 |
| | | | | 128/903 |
| 6,064,064 | A | 5/2000 | Castleman | |
| 8,049,613 | B2 | 11/2011 | Poder | |
| 8,289,147 | B2 | 10/2012 | Poder | |
| 9,530,303 | B2 * | 12/2016 | Poder | G08B 13/2491 |
| 2002/0171544 | A1 * | 11/2002 | Schmurr | G08B 25/04 |
| | | | | 340/517 |
| 2004/0056765 | A1 | 3/2004 | Anderson et al. | |
| 2004/0215750 | A1 | 10/2004 | Stilp | |
| 2005/0038326 | A1 | 2/2005 | Mathur | |
| 2006/0071802 | A1 * | 4/2006 | Right | G08B 3/10 |
| | | | | 340/628 |
| 2006/0195716 | A1 | 8/2006 | Bittner | |
| 2007/0050777 | A1 * | 3/2007 | Hutchinson | G06F 11/0781 |
| | | | | 718/104 |
| 2007/0262857 | A1 | 11/2007 | Jackson | |
| 2008/0048861 | A1 | 2/2008 | Naidoo et al. | |
| 2008/0211663 | A1 * | 9/2008 | Mansfield | H04B 3/54 |
| | | | | 340/538 |
| 2008/0291036 | A1 * | 11/2008 | Richmond | G08B 17/10 |
| | | | | 340/628 |
| 2008/0311878 | A1 * | 12/2008 | Martin | H04M 11/04 |
| | | | | 455/404.1 |
| 2008/0311879 | A1 * | 12/2008 | Martin | H04M 11/04 |
| | | | | 455/404.1 |
| 2009/0027225 | A1 * | 1/2009 | Farley | G08B 7/06 |
| | | | | 340/6.11 |
| 2009/0109016 | A1 * | 4/2009 | Baker | G08B 17/00 |
| | | | | 340/506 |
| 2011/0065414 | A1 * | 3/2011 | Frenette | H04M 11/04 |
| | | | | 455/466 |
| 2013/0273875 | A1 * | 10/2013 | Martin | H04M 11/04 |
| | | | | 455/404.1 |
| 2015/0370615 | A1 * | 12/2015 | Pi-Sunyer | F24F 11/62 |
| | | | | 700/276 |
| 2016/0125724 | A1 | 5/2016 | Poder | |

FOREIGN PATENT DOCUMENTS

| | | | |
|---|---|---|---|
| JP | 2008009812 | A * | 1/2008 |
| WO | 9939505 | A1 | 8/1999 |
| WO | 0201531 | A1 | 1/2002 |
| WO | 2006/091422 | A2 | 8/2006 |
| WO | 2008013359 | A1 | 1/2008 |

OTHER PUBLICATIONS

EP office action issued in EP 12183032.7—Mailing date: Jul. 17, 2013.

Response to European Search Report—EP12183032.7—Filed on Jun. 7, 2013.

Response to Office Action EP12183032.7 dated Jul. 17, 2013—as filed on Nov. 15, 2013.

Valera, M. et al., "Intelligent Distributed Surveillance Systems: A Review," IEEE Proceedings F. Communications, Radar & Signal Processing, Institution of Electrical Engineers, vol. 152, No. 2, Apr. 8, 2005, pp. 192-204.

International Search Report dated Mar. 2, 2010 in European Application No. 09175981.

European Office Action dated Feb. 21, 2011 in Application No. 09175981.1.

Canadian Intellectual Property Office Action dated Mar. 27, 2012 in Canadian Application No. 2,685,652.

European Summons to Attend Oral Proceedings dated Mar. 29, 2012 in European Application No. 09175981.1.

European Summons to Attend Oral Proceedings dated Feb. 4, 2015, in European Application No. 12183032.7.

* cited by examiner

BUILDING SECURITY SYSTEM

This application is a continuation of pending U.S. patent application Ser. No. 15/352,853, filed on Nov. 16, 2016, which is a continuation of U.S. patent application Ser. No. 14/936,099, filed on Nov. 9, 2015 (now U.S. Pat. No. 9,530,303), which is a continuation of U.S. patent application Ser. No. 14/511,906, filed on Oct. 10, 2014 (now U.S. Pat. No. 9,214,080), which is a continuation of U.S. patent application Ser. No. 13/604,938, filed on Sep. 6, 2012 (now U.S. Pat. No. 8,902,311), which is a continuation of U.S. patent application Ser. No. 13/243,463, filed on Sep. 23, 2011 (now U.S. Pat. No. 8,289,147), which is a continuation of U.S. patent application Ser. No. 12/324,139, filed on Nov. 26, 2008 (now U.S. Pat. No. 8,049,613), which applications are hereby incorporated by reference.

BACKGROUND OF THE INVENTION

1. Field of the Invention

The present invention relates to building security systems.

2. Background Art

FIG. 1 illustrates a building security system 10 where a gateway/security panel 12 within a building 14 processes alarm system information. The panel 12 locally generates an alarm if the alarm system information indicates a suitable security risk. The alarm system information may be derived from a number of sensors 16 positioned throughout the building 14. The security panel 12 may immediately generate the alarm and/or transmit the alarm to a central monitoring station 18 for verification. In either case, the need for the alarm is determined locally at the building 14.

These local determinations can be problematic, at least, from a service and maintenance perspective. Since the gateway/security panel software used to assess the need for the alarm resides locally in the building 14, any updates or modifications relevant to alarm assessments must be made at the building 14. This requires the panel 12 to be locally modified if it is to accommodate new devices and application logic when new devices, monitoring techniques, or other changes to the building security system are desired. This can increase both complexity and cost of devices in the building 14 when new monitoring features are added or current monitoring capabilities are adjusted.

BRIEF DESCRIPTION OF THE DRAWINGS

The present invention is pointed out with particularity in the appended claims. However, exemplary embodiments and certain features of the present invention will be described below in conjunction with the accompany drawings, in which:

DETAILED DESCRIPTION OF THE PREFERRED EMBODIMENT(S)

Figure 1:
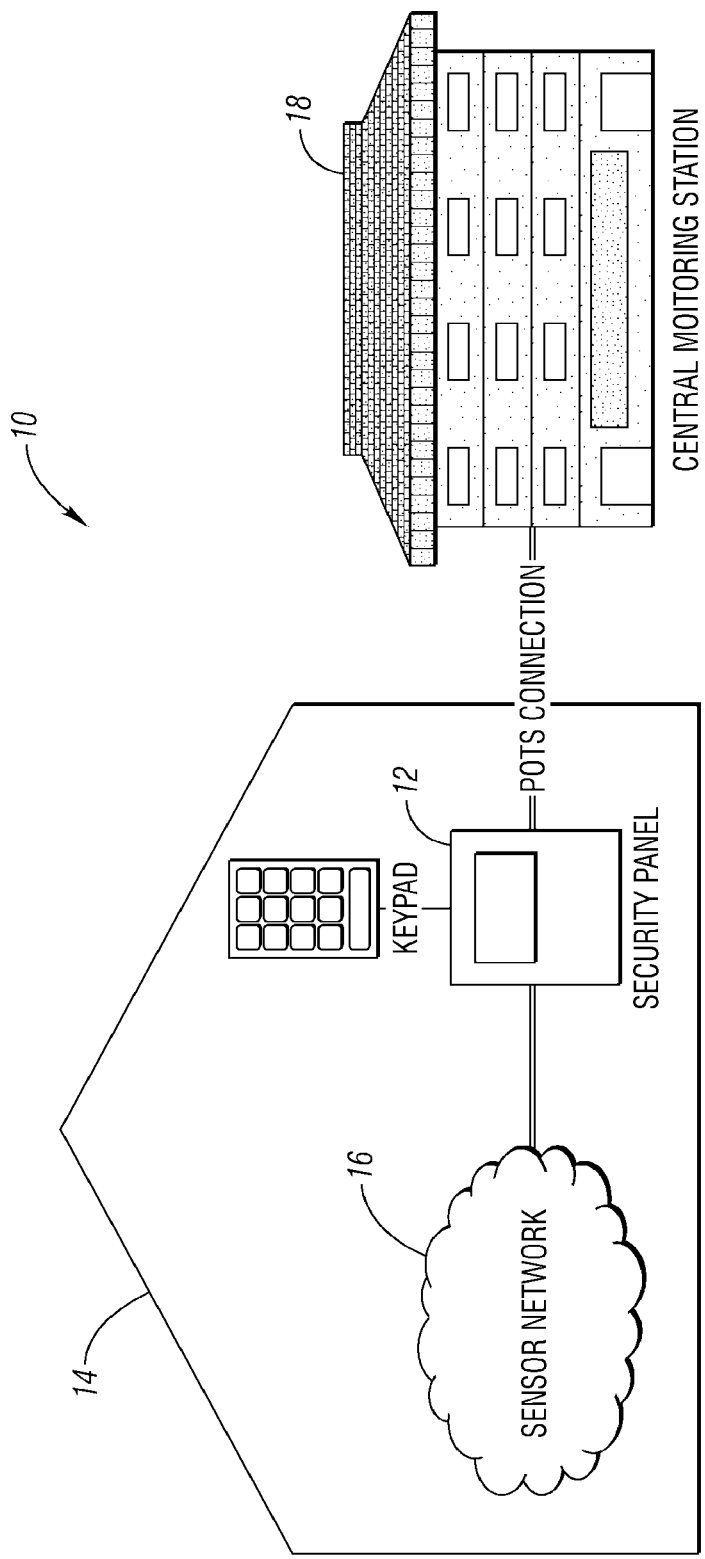
FIG. 1 illustrates a building security system.
Figure 2:
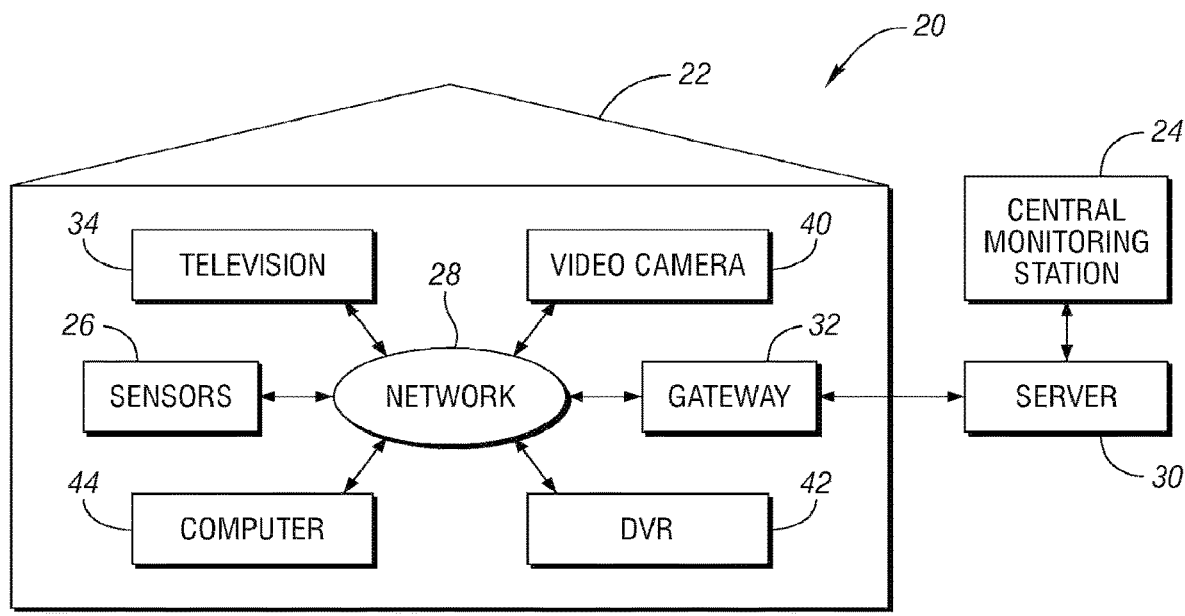
FIG. 2 illustrates a building security system in accordance with one embodiment of the present invention.

FIG. 2 illustrates a building security system 20 in accordance with one embodiment of the present invention. The building security system 20 may be configured to support security-related surveillance and services for a home, office, or other building 22. A security service provider 24, such as a central monitoring station, may communicate with the building 22 to support any number of building security processes. The system 20 may support security processes that rely on one or more sensors 26, such as audio, video, temperature, air quality, and presence sensors, to monitor related conditions within the building 22. Data regarding the monitored conditions can be communicated over a network 28 to a central monitoring server 30. While FIG. 2 illustrates an embodiment of the invention in connection with a building, the invention is not limited to implementation with a building. By way of example only, the invention can be implemented with any number of buildings, a facility or the like. Nor does the type of building(s) or facility(ies) limit the invention. By way of example only, the building(s) and/or facility(ies) could be residential, commercial or the like.

The network 28 may be any type of wireless or wireline network such as, but not limited, to a high speed data network used by cable television service providers to support cable television signaling and/or other types of networks used to support high speed data and non-television related signaling. The network may be used to support continuous transmission of data from the sensors 26 regardless of whether the monitored conditions have changed. This stream of data can be transmitted to the central monitoring server 30 for further processing.

The central monitoring server 30 may assess the need to instigate an alarm from the information provided by the sensors 26. A gateway 32, for example a set-top box (STB), cable modem, router, and/or other service provider/supported device within the building may be used to communicate the data collected by the sensors 26 regarding the conditions in the building 22 to the central monitoring server 30. The gateway 32 encapsulates or otherwise packages the data provided by the sensors 26 for transmission to the central monitoring server 30 without performing security-related processing.

The security-related processing associated with triggering the alarms is performed by the central monitoring server 30. This alleviates processing demands on the gateway 32. If changes or other updates to the security process are needed, i.e., to support new functionality, home devices, sensors, etc., the central monitoring server 30 may be updated instead of requiring significant updates to the gateway 32.

The central monitoring server 30 may be configured to monitor conditions in a number of buildings 22 and to separately instigate alarms in each building 22. Each building 22 may similarly transmit sensed conditions to the central monitoring server 30 for processing. Because the central monitoring server 30 is used instead of the gateway 32 to assess the need for the alarm, the central monitoring server 30 is updated to support updated functionality in each of the buildings 22 without requiring significant updates in the buildings. This can limit the cost of updates when the service provider 24 provides additional services to customers.

The central monitoring server 30 may include any number of applications that perform any number of security processes, such as, but not limited to, those associated with elder monitoring, video monitoring, audio monitoring, medical monitoring, energy management, and/or some combination thereof.

For example, elder monitoring may include monitoring for movements within the building 22 and generating an alarm if movements are not determined over a period of time. Video monitoring may use facial recognition or other techniques to assess whether intruders are within the building 22. For example, a video camera 40 may be included to capture video from within the building 22, and a DVR 42 may begin recording video when presence detectors sense a presence within a room while the building security system 20 is armed. This video can be transmitted to the server 30 for intruder analysis and/or alarm verification. Similarly, audio monitoring can operate with the video monitoring to support related security assessments. The information from any sensor 26 can be used with information from the other sensors 26 to assess the need for an alarm.

Figure 3:
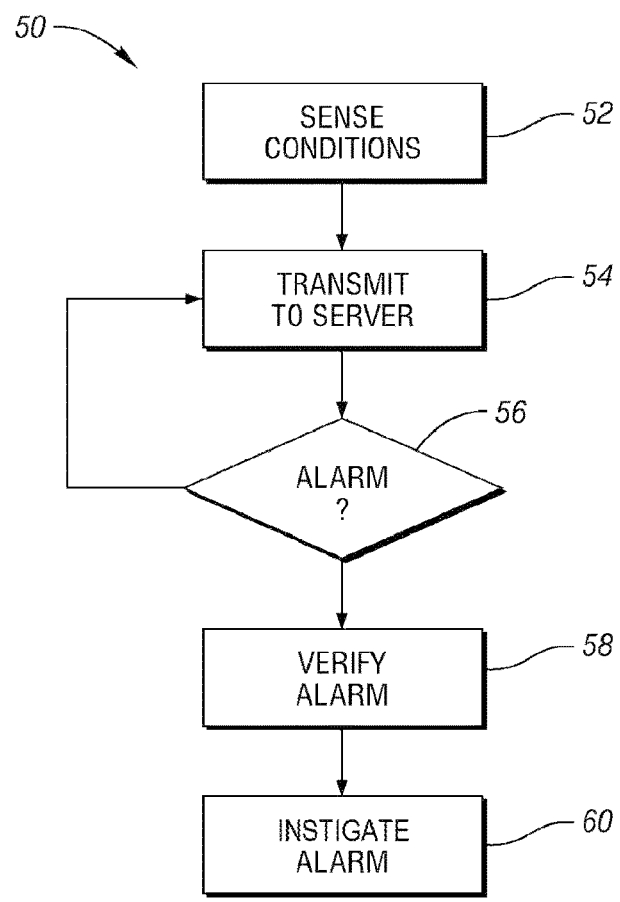
FIG. 3 illustrates a flowchart for a method of supporting building security in accordance with one embodiment of the present invention.

FIG. 3 illustrates a flowchart 50 for a method of supporting building security in accordance with one embodiment of the present invention. The method may be used to instigate any type of alarm and to facilitate any type of security measure. Instead of detailing each of the numerous types of alarms contemplated by the present invention, the described alarm, or generic alarm, is intended to include any type of alarm. The method, without intending to limit the scope and contemplation of the present invention, is predominately described with respect to the processes used to determine a need to instigate the alarm and other features associated therewith.

Block 52 relates to sensing one or more conditions within a building 22. This may include the use of any type of sensor 26 to sense any type of condition within the building 22. Some of the sensors 26 may be presence sensors that sense the presence of a human or animal, door sensors that sense whether a door (room, appliance, cabinet, etc.) is opened or closed, temperature sensors (room, body, etc.), air quality sensors (e.g. carbon monoxide detectors), and the like. The sensors 26 may also include video, audio, and other multiple media sensors. Each of the sensors 26 are connected to a building network 28 having capabilities that allow the conditions sensed by the sensors 26 to be delivered to the gateway 32.

Block 54 relates to the gateway 32 transmitting the sensed data to the central monitoring server 30. This is done without assessing the need to instigate or otherwise generate an alarm. Of course, the present invention contemplates performing some alarm assessment at the building and optionally generating the alarm without reliance or complete reliance on the central monitoring server 30. The data may be transmitted over any one-way or two-way wireless (e.g., GSM, CDMA, Wi-Fi, WiMax) or wireline network 28 (e.g., fiber optic, hybrid fiber coaxial, coaxial only, copper pair).

Block 56 relates to determining a need to generate or otherwise instigate an alarm. The need to instigate the alarm is determined by the central monitoring server 30 based on the information transmitted in Block 54 and without assessment by the gateway 32. The alarm may be any type of alarm and may vary depending on the conditions within the building 22. The alarm may be varied over time and in response to changes in conditions at the building 22, i.e., the urgency of the alarm can be escalated if conditions change within the building 22.

One type of alarm may be a building-based alarm that requires playback of an audio alert (siren, message, etc.), actuation of a device (door lock, fire extinguisher, etc.), or the execution of other operations at the building 22. Another type of alarm may be a non-building-based alarm that requires alerting or otherwise communicating with a governmental services agency, such as police, fire, medical, or other entity outside the building 22. Yet another type of alarm may include some combination of the building and non-building-based alarms.

Block 58 relates to verifying authenticity of the alarm. The authenticity of the alarm may be verified in an effort to combat false alarms and other inappropriate allocations of resources. In some cases, customers can be penalized if governmental service agencies respond to false alarms. The verification process may require the entry of a password or other security measure to insure an authorized person or entity verifies the need or lack of need for the alarm.

One process for verifying alarm authenticity may require in-building verification. The in-building verification may be of the type that requires an occupant within the building 22 to verify the necessity of instigating the alarm. The central monitoring server 30 may open a communication channel with the building 22 or, more particularly, with one or more devices in the building 22. The communication may be sufficient to control various operations of the device in order to request an occupant to respond to a verification response message.

One verification request may include displaying a message on a television within the building 22. The central monitoring server 30 may instruct the STB 34 to display a message on the television 34 that requests the occupant to acquiesce to the alarm, such as by selecting a button on a remote control or on the STB 34. The central monitoring server 30 may also open a communications session (POTS call, IM session, SMS message, etc.) or VoIP call with a device in the building 22 to request confirmatory information. The communications necessary to these operations and other operations may be carried out over any wireline or wireless network 18, including a cable television network.

Another verification process may include verifying the alarm from other information collected from the building 22. If a fire is detected with a fire sensor, for example, the sensors that sense temperature and air quality may be used to verify the fire detected by the fire sensor. If an intruder is detected with a presence sensor, for example, video may be retrieved from the DVR 42 and reviewed by a computer 44 for facial recognition or played for a human operator to assess the presence of an intruder.

These and other processes of verifying the sensed conditions triggering the alarm with other sensed conditions can be helpful if communications with the building 22 are lost or otherwise disrupted. Rather than relying on communications with the building 22, the central monitoring server 30 can analyze the information it has already accumulated to verify the need for the alarm. This process can also be helpful if the only person in the building 22 is an intruder or another individual that is unwilling or unable to verify authenticity.

Block 60 relates to instigating the alarm. The instigated alarm may vary depending on the events triggering the alarm. The scope, duration, intensity, and other parameters of the alarm may be varied over time. The central monitoring server 30 may adjust or discontinue the alarm if additional information is received from the sensors 26 within the building 22 and/or in response to an interrupt. An interrupt may be instigated if a building occupant's response to the verification request after the alarm is instigated and/or if an entity arriving at the building otherwise terminates the alarm.

As supported above, one non-limiting aspect of the present invention contemplates a common, extensible protocol for a gateway 32 in a building 22 to encapsulate or translate sensor 26 data. This data can then be sent to one or many application servers 30 that will decode the data and determine if action needs to be taken based on user-selected monitoring criteria. One scenario may include a building 22 that has signed up for both a building security service and an elder monitoring service. A motion sensor 26 in the living room can be used to detect motion in the building 22. The gateway 32 can wrap a data packet from the activated motion sensor 26 with a tag that identifies the particular building 22 or gateway 32 and send it to the application server 30. The data packet can be received by several, if not all of the application servers 30 and used as necessary. The security server 30 can determine that a motion sensor 26 was activated in the building 22, and optionally, verify that the building 22 has subscribed to its service. The security server 30 can search its database to verify if the alarm is currently armed or disarmed. If the alarm is armed, the security server 30 can send a signal to the central monitoring station 24 indicating an intrusion. If it is disarmed, the security server 30 can log the event and remain inactive. The elder monitoring server 30 can also receive the same data packet from the building 22 and verify that the building is a subscriber. The elder monitoring server 30 can be configured to notify a friend/neighbor/family member in case there is no "activity" (motion) in the building 22 for a period of time. Because motion is detected, the countdown timer can be reset in the elder monitoring server 30. Should the timer reach zero, the alarm notification can be sent.

By building the system 20 in this manner, the gateway 32 can be an extremely inexpensive device or integrated into other devices already in the building 22. The application can be standard regardless of what devices are added to the building 22 or what services are added to the network. Additionally, services may include medical monitoring, audio monitoring, visual monitoring, or combinations thereof. Additional features include using the gateway 32, television 34, or internet to activate or deactivate the security system 20 and using the STB/television 34, or internet to monitor the building 22 from a remote location. Optionally, the STB/television 34, or a displayed supported through an application running on it, may be used to check the status of any one or more of the sensors 26 at anytime, such as to view video of particular areas within the building 22 upon hearing a threatening sound, assess whether a door sensor is detecting a door to be open, assess whether the security system 20 has been armed, etc.

The foregoing is predominately described with respect to activating a security related alarm, such as but not limited to illuminating a light source, displaying a message, calling an emergency response entity, locking doors, activating a siren or taking other security related measures. The present invention, however, is not intended to be so limited. The present invention contemplates non-security related alarms, such as alarms used to indicate faults or failures within appliances within the home, a need to replace a lighting source, a need to answer a door, and/or to take action in response to any number of measureable events occurring within a building or facility. As such, the term 'alarm' as used throughout the foregoing is intended to encompass any type of message, transmission, activation, or other responsive event used to communicate a significant, meaningful, relevant or monitored for change in status as reflected by one or more sensed conditions.

Particular embodiments of the present invention have been disclosed and described above; however, it is to be understood that the disclosed embodiments are merely exemplary of the invention, which may take various alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

The invention claimed is:

1. A method comprising:
   receiving, by a computing device, sensor data that is associated with a first sensor and that indicates a condition at a premises;
   causing, by the computing device and based on the condition being a trigger for an alarm, a first type of alarm to be output at the premises, wherein the first type of alarm is associated with a first urgency level;
   after causing the first type of alarm to be output at the premises, sending, by the computing device to a device located at the premises, a request for additional sensor data;
   receiving, from the device located at the premises and based on the request, the additional sensor data; and
   causing, based on the additional sensor data indicating a changed condition at the premises, a second type of alarm to be output at the premises, wherein the second type of alarm is different from the first type of alarm and is associated with a second urgency level higher than the first urgency level.

2. The method of claim 1, wherein the first sensor comprises a fire sensor, and wherein the additional sensor data is associated with a second sensor comprising at least one of a temperature sensor or an air quality sensor.

3. The method of claim 1, wherein the device located at the premises comprises a gateway, and wherein the additional sensor data is received via the gateway.

4. The method of claim 1, wherein the second type of alarm associated with the second urgency level differs from the first type of alarm associated with the first urgency level in intensity.

5. The method of claim 1, further comprising verifying, by the computing device, based on the additional sensor data, and after a communication between the computing device and the device located at the premises is disrupted, the condition being the trigger for the alarm.

6. The method of claim 1, wherein the additional sensor data further indicates an escalation of the condition at the premises, and wherein the additional sensor data does not comprise voice data.

7. The method of claim 1, wherein the first type of alarm, associated with the first urgency level, comprises a first duration, and wherein the second type of alarm, associated with the second urgency level, comprises a second duration greater than the first duration.

8. The method of claim 1, wherein the additional sensor data is received via a wireless connection to the device located at the premises.

9. The method of claim 1, wherein the sensor data comprises presence sensor data, and wherein the additional sensor data comprises at least one of a recorded video footage or facial recognition information.

10. The method of claim 1, wherein the first type of alarm comprises one of an audio alert, a siren, a message, actuation of a device, actuation of a door lock, actuation of a fire extinguisher, execution of an operation, or an alert to a service agency, and wherein the second type of alarm comprises a different one of the audio alert, the siren, the message, the actuation of the device, the actuation of the door lock, the actuation of the fire extinguisher, the execution of the operation, or the alert to the service agency.

11. The method of claim 1, wherein the changed condition comprises a change relative to the condition at the premises at a time the sensor data is received by the computing device.

12. The method of claim 1, wherein the first sensor is a fire sensor, and wherein the additional sensor data is temperature sensor data that verifies the condition, indicated by the sensor data associated with the fire sensor, being the trigger for the alarm.

13. The method of claim 1, further comprising:
causing, by the computing device, a settop box (STB) located at the premises to display a message on a display device requesting a user to acknowledge the condition at the premises.

14. The method of claim 1, further comprising:
initiating, by the computing device, a communication session with a second device located at the premises, wherein the sending the request for the additional sensor data is based on a disruption of the communication session with the second device.

15. The method of claim 1, further comprising:
receiving, by the computing device, second additional sensor data associated with a second sensor located at the premises; and
causing, by the computing device and based on the second additional sensor data, output of the first type of alarm and output the second type of alarm to stop.

16. The method of claim 1, wherein the additional sensor data comprises motion sensor data, and the method further comprises:
notifying, by the computing device and based on comparing the motion sensor data to a countdown timer, a neighbor to the premises that a period of inactivity of an individual at the premises is detected.

17. The method of claim 1, wherein the first sensor is a motion sensor, wherein the first type of alarm comprises notifying a neighbor of the condition at the premises, and wherein the second type of alarm comprises notifying a governmental services agency of the changed condition at the premises.

18. The method of claim 1, further comprising selecting, by the computing device and based on the first type of alarm, a second sensor to provide the additional sensor data.

19. A method comprising:
sending, by a computing device to a server device, first sensor data that indicates an alarm condition at a first location;
receiving, after the sending the first sensor data and from the server device, a first command to output a first type of alarm associated with a first urgency level;
causing, based on the first command, output of the first type of alarm associated with the first urgency level;
after causing output of the first type of alarm, receiving, by the computing device and from the server device, a request for second sensor data;
sending, by the computing device to the server device, the second sensor data, wherein the second sensor data indicates a changed condition at the first location after the first type of alarm is output;
receiving, after the sending the second sensor data indicating the changed condition at the first location, a second command to escalate an urgency level; and
causing, based on the second command, output of a second type of alarm that is different from the first type of alarm and is associated with a second urgency level higher than the first urgency level.

20. The method of claim 19, wherein the computing device comprises a first sensor at the first location, and wherein the first sensor data is associated with the first sensor.

21. The method of claim 19, wherein the first sensor data and the second sensor data are sent to a second location different from the first location.

22. The method of claim 19, wherein the first sensor data indicates a presence at the first location and the second sensor data comprises captured video from a camera.

23. The method of claim 19, wherein the second type of alarm associated with the second urgency level differs from the first type of alarm associated with the first urgency level by one or more of a scope, a duration, or an intensity.

24. The method of claim 19, wherein the first sensor data is from a first sensor, and the second sensor data is from a second sensor different from the first sensor.

25. The method of claim 19, wherein the changed condition comprises a change relative to the alarm condition at the first location at a time the first sensor data is sent.

26. A method comprising:
receiving, by a computing device and from a first sensor, first sensor data indicating an alarm condition at a first location;
determining, based on the first sensor data indicating the alarm condition, a first type of alarm, associated with a first urgency level, to be output at the first location;
sending, by the computing device and to a device at the first location, a request for second sensor data from a second sensor at the first location;
receiving, after the first type of alarm is output at the first location, the second sensor data;
determining, based on the second sensor data indicating a changed condition at the first location, a second type of alarm associated with a second urgency level, wherein the second urgency level is higher than the first urgency level; and
causing, based on the changed condition at the first location, activation of the second type of alarm associated with the second urgency level at the first location.

27. The method of claim 26, wherein the computing device is located at a second location that is remote from the first location.

28. The method of claim 26, wherein the second type of alarm associated with the second urgency level differs from the first type of alarm associated with the first urgency level by one or more of a scope, a duration, or an intensity.

29. The method of claim 26, wherein the first type of alarm is associated with a building-based alarm and the second type of alarm is associated with a non-building-based alarm.

30. The method of claim 26, further comprising verifying, by the computing device, based on the second sensor data, and after a communication between the computing device and the first location is disrupted, the alarm condition.

31. The method of claim 26, wherein the changed condition comprises a change relative to the alarm condition at the first location at a time the first sensor data is received.

* * * * *